(12) United States Patent
Glasenapp et al.

(10) Patent No.: US 10,520,390 B2
(45) Date of Patent: Dec. 31, 2019

(54) MEASURING INDIVIDUAL DATA OF SPECTACLES

(71) Applicants: Carl Zeiss AG, Oberkochen (DE); Carl Zeiss Vision International GmbH, Aalen (DE)

(72) Inventors: Carsten Glasenapp, Oberkochen (DE); Matthias Hornauer, Lauchheim-Hülen (DE)

(73) Assignees: Carl Zeiss AG, Oberkochen (DE); Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/852,899

(22) Filed: Dec. 22, 2017

(65) Prior Publication Data

US 2018/0120198 A1    May 3, 2018

Related U.S. Application Data

(63) Continuation-in-part of application No. PCT/EP2016/064764, filed on Jun. 24, 2016.

(30) Foreign Application Priority Data

Jun. 25, 2015    (DE) .................. 10 2015 211 879

(51) Int. Cl.
| | |
|---|---|
| *G01M 11/02* | (2006.01) |
| *G02C 7/02* | (2006.01) |

(52) U.S. Cl.
CPC ............. *G01M 11/02* (2013.01); *G02C 7/021* (2013.01)

(58) Field of Classification Search
CPC combination set(s) only.
See application file for complete search history.

(56) References Cited

U.S. PATENT DOCUMENTS 4,370,058 A * 1/1983 Trotscher ........... G01M 11/0228
356/125
5,155,508 A * 10/1992 Onufryk .................. G02C 7/14
351/158

(Continued)

FOREIGN PATENT DOCUMENTS

| DE | 1238690 | 10/1967 |
|---|---|---|
| DE | 4110915 A1 | 10/1991 |

(Continued)

OTHER PUBLICATIONS

Ophthalmic optics—Spectacle lenses—Vocabulary (ISO 13666:2012); German and English version EN ISO 13666:2012, Oct. 2013.

(Continued)

*Primary Examiner* — Mohamed K Amara
(74) *Attorney, Agent, or Firm* — Thrive IP®; Georg M. Hasselmann

(57) ABSTRACT

An apparatus and a method for measuring individual data of spectacles arranged in a measurement position are disclosed. The spectacles have a left and/or a right spectacle lens. The apparatus has a display for displaying a test structure. The apparatus contains an image capture device for capturing the test structure with an imaging beam path which passing through the left spectacle lens and/or the right spectacle lens of the spectacles. Further, the apparatus includes a computer unit with a computer program for determining a refractive power distribution for at least a section of the left spectacle lens and/or the right spectacle lens from the image of the test structure captured by the image capture device and a known spatial orientation of the display relative to the image capture device. To measure individual data of spectacles, the spectacles are arranged in a measurement position.

11 Claims, 10 Drawing Sheets

(56) References Cited

U.S. PATENT DOCUMENTS

| | | | |
|---|---|---|---|
| 5,175,594 A | 12/1992 | Campbell | |
| 5,307,141 A | 4/1994 | Fujieda | |
| 5,844,671 A | 12/1998 | Kajino et al. | |
| 5,971,537 A * | 10/1999 | Fukuma | G01M 11/0207 351/44 |
| 5,973,772 A | 10/1999 | Fukuma et al. | |
| 5,978,083 A * | 11/1999 | Muller | G01M 11/0228 356/318 |
| 7,486,389 B2 | 2/2009 | Imaizumi | |
| 7,728,962 B2 | 6/2010 | Hornauer et al. | |
| 7,800,849 B2 * | 9/2010 | Holderer | G01M 11/005 359/822 |
| 8,081,840 B2 | 12/2011 | Laurent | |
| 9,250,434 B2 * | 2/2016 | Morrin | G02B 21/34 |
| 2002/0085196 A1 | 7/2002 | Fukuma et al. | |
| 2005/0162641 A1 * | 7/2005 | Yanagi | G01M 11/0228 356/124 |
| 2005/0237513 A1 * | 10/2005 | Hayashi | G01M 11/0228 356/124 |
| 2007/0121100 A1 | 5/2007 | Divo | |
| 2007/0247639 A1 * | 10/2007 | Amstel | G01M 11/025 356/601 |
| 2009/0115985 A1 * | 5/2009 | Maeda | G03B 27/52 355/55 |
| 2009/0214086 A1 | 8/2009 | Thomet | |
| 2011/0013137 A1 * | 1/2011 | Kitani | G01M 11/0228 351/159.42 |
| 2011/0051127 A1 * | 3/2011 | Kusaka | G01M 11/0228 356/128 |
| 2013/0148111 A1 * | 6/2013 | Hanssen | G01M 11/081 356/124 |
| 2015/0011026 A1 * | 1/2015 | Oishi | H01L 22/20 438/14 |
| 2015/0155137 A1 * | 6/2015 | Sentoku | G11B 5/315 430/296 |
| 2015/0177625 A1 * | 6/2015 | De Boer | B82Y 40/00 355/67 |
| 2015/0185623 A1 * | 7/2015 | Yamaguchi | G03F 7/70575 355/67 |
| 2015/0261098 A1 * | 9/2015 | Zhang | G03F 9/7088 355/71 |
| 2016/0161403 A1 * | 6/2016 | Sugimoto | G01N 21/45 356/517 |
| 2016/0223321 A1 * | 8/2016 | Segawa | H01L 23/544 |

FOREIGN PATENT DOCUMENTS

| | | |
|---|---|---|
| DE | 69726506 T2 | 11/2004 |
| DE | 10333426 B4 | 2/2006 |
| DE | 69637346 T2 | 10/2008 |
| DE | 102010007922 A1 | 8/2011 |
| EP | 1679499 A2 | 7/2006 |
| GB | 2539844 B * | 3/2019 |
| WO | 95/22748 A1 | 8/1995 |
| WO | 2005/121740 A1 | 12/2005 |

OTHER PUBLICATIONS

Office action by the German Patent and Trademark Office (and English-language translation thereof) issued in DE 10 2015 211 879.7, to which this application claims priority, dated May 13, 2016.

International Search Report (and English-language translation thereof) issued in PCT/EP2016/064764, to which this application claims priority, dated Sep. 23, 2016.

International Preliminary Examination Report (and English-language translation thereof) issued in PCT/EP2016/064764, to which this application claims priority, dated Dec. 28, 2017.

* cited by examiner

MEASURING INDIVIDUAL DATA OF SPECTACLES

CROSS-REFERENCE TO RELATED APPLICATIONS

This application is a continuation-in-part application of International Application No. PCT/EP2016/064764 filed on Jun. 24, 2016 and designating the United States, and claims priority to German patent application DE 10 2015 211 879.7 filed on Jun. 25, 2015, both of which are hereby incorporated by reference in their entireties.

TECHNICAL FIELD

The disclosure relates to an apparatus for measuring individual data of spectacles arranged in a measurement position, the spectacles having a left and/or a right spectacle lens. Furthermore, the disclosure relates to a method for measuring individual data of spectacles arranged in a measurement position.

BACKGROUND

An apparatus and a method of the type set forth at the outset are known from US 2007/0121100 A1. Described therein is a measurement apparatus for measuring spectacles, having a first measurement station in which there is an illumination device and a first image capture device with a camera serving to capture the permanent markings on a spectacle lens. In a further measurement station, arranged at a distance from the first measurement station, the measurement apparatus has a further image capture device with a camera serving to measure the refractive power of spectacle lenses. In the measurement apparatus, spectacles to be measured have to be displaced in a referenced manner between the measurement stations by way of a receptacle mechanism.

DE 1 238 690 B1 describes a lensmeter with a spectacle mount for measuring the vertex power of spectacle lenses which are held in the frame of spectacles.

U.S. Pat. No. 8,081,840 B2 discloses an apparatus for checking an optical element that is transparent to light or that reflects light, having an illumination device and a camera. In the apparatus, the optical element to be tested is arranged between the illumination device and the camera. Then, a multiplicity of patterns which run through a phase shift are provided with the aid of the illumination device. Subsequently, an individual image is calculated from the phase-shifted patterns, and optical data of the optical element is derived from the individual image.

U.S. Pat. No. 5,307,141 describes an apparatus for determining the refractive power distribution of spectacle lenses in a pair of spectacles. However, permanent markings of the spectacle lenses that define a local, body-inherent coordinate system are not captured in this case.

WO 95/22748 A1 and U.S. Pat. No. 7,486,389 B2 disclose an apparatus for determining the refractive power distribution of spectacle lenses in which spectacle lenses are measured without a spectacle frame.

U.S. Pat. No. 5,973,772 A specifies a system for determining the refractive power distribution of spectacle lenses in spectacles, the system having a first measurement station for determining the form of the frame and containing a further measurement station, arranged separately from the first measurement station, serving to determine optical characteristics of spectacle lenses when these have not yet been received in spectacles.

In order to facilitate in-focus vision for a spectacle wearer, the spectacle lenses must be correctly positioned and aligned in relation to the eyes of the spectacle wearer in the frame of a pair of spectacles. In principle, the correct alignment and positioning is required in all spectacle lenses. The correct alignment and positioning of the spectacle lens is of particular importance in the case of individualized optical spectacle lens designs and/or in the case of progressive lenses. Progressive lenses allow spectacle wearers in-focus vision in different use situations, e.g., at different distances, by changing the viewing direction only, without this requiring a relatively large accommodation success of the eyes in the process. Individual lenses and/or progressive lenses have one or more reference points, e.g., a distance reference point and a near reference point, the orientation of which, depending on the use situation, must be adapted to the location of the pupils of the eyes of a spectacle wearer.

In technical terms, the near reference point and the distance reference point of progressive lenses are also referred to as near construction point and distance construction point. A definition of these points is provided in Chapters 5.13 and 5.14 of the EN ISO 13666:1998 standard, the entirety of which is referred to herewith and the content of which is incorporated into this application.

Ideal vision with progressive lenses presumes that the progressive lenses held in a spectacle frame are positioned in front of the eyes of the spectacle wearer in such a way that the orientation of the distance reference point and the orientation of the near reference point conform to the viewing directions of the spectacle wearer when looking into the distance and when looking up close. Therefore, according to the specifications in Chapter 7 of the DIN EN ISO 8980-2:2004 standard, progressive spectacle lenses must be provided with at least two permanent markings. According to the aforementioned standard, these at least two markings must exist on a progressive spectacle lens with a spacing of 34 mm and must be arranged symmetrically to a vertical plane through the fitting point or the prism reference point. These two markings define a local, body-inherent coordinate system for the spectacle lens. These markings can be used to reconstruct in a spectacle lens both the lens horizontal and reference points, such as the distance and near reference points, the so-called fitting point defined in Chapter 5.24 of the EN ISO 13 666:1998 standard or the prism reference point defined in Chapter 14.2.12 of the EN ISO 13 666:1998 standard.

Pursuant to the EN ISO 13 666:1998 standard, the fitting point is a point on the front surface of a spectacle lens or spectacle lens semi-finished product, which, according to the specification from the manufacturer, should serve as reference point for positioning the spectacle lens in front of the eyes.

In the case of uncut spectacle lenses, which an optician obtains from a spectacle lens producer for a spectacle wearer on account of a refraction deficit determined for the spectacle wearer, the orientation of these points with the aforementioned markings is specified implicitly. That is to say, an optician can establish the distance and near reference point, the fitting point and the prism reference point on the basis of the aforementioned markings or on the basis of figures that are printed on the spectacle lenses and referenced to the markings. Pursuant to the EN ISO 13 666:1998 standard, the prism reference point is the point specified by a manufacturer on the front surface of a progressive spectacle lens or a progressive spectacle lens semi-finished product at which the prismatic effects of the completed lens have to be determined.

This makes it easier for an optician to align the uncut spectacle lens correctly prior to grinding and then insert it into a spectacle frame in the correct position, such that the spectacle wearer is provided with optimal vision.

This disclosure understands individual data of spectacles to mean, in particular, so-called spectacle-wearer-specific fitting data of the spectacles, i.e., data from the group of refractive power of a spectacle lens of the spectacles, refractive power distribution of a spectacle lens of the spectacles, the position of the near reference point and the position of the distance reference point of a spectacle lens of the spectacles in a coordinate system that is referenced to the spectacles and hence, indirectly, to a spectacle wearer who wears these spectacles as well. This disclosure understands individual data of spectacles to mean also the orientation of the at least two markings on a progressive spectacle lens according to the DIN EN ISO 8980-2:2004 standard, in a coordinate system that is referenced to the spectacles in which the progressive lens is arranged.

SUMMARY

It is an object of the disclosure to facilitate checking of the individual data of spectacles with spectacle lenses held therein.

This object is achieved by an apparatus as disclosed herein.

The apparatus according to the disclosure for measuring individual data of spectacles arranged in a measurement position, the spectacles having at least one of a left spectacle lens and a right spectacle lens, contains a display for displaying a test structure. The apparatus has an image capture device for capturing the test structure with an imaging beam path which passes through the left spectacle lens and/or the right spectacle lens of the spectacles. Moreover, there is a computer unit in the apparatus. The computer unit contains a computer program that determines a refractive power distribution for at least a section of the left spectacle lens and/or the right spectacle lens from the image of the test structure captured by the image capture device and a known spatial orientation of the display relative to the image capture device and also, typically, a known spatial orientation of the spectacles relative to the image capture device.

An apparatus according to the disclosure for measuring individual data of spectacles typically contains a mount which defines a known spatial orientation of the spectacles relative to the image capture device for spectacles mounted thereon which are arranged in the measurement position. This mount may be formed in a receptacle of the apparatus for arranging the spectacles in the measurement position. As an alternative hereto, or additionally, an apparatus according to the disclosure for measuring individual data of spectacles may have a device for determining the spatial orientation of spectacles arranged in the measurement position relative to the image capture device. By way of example, the device can be a holder, for example at least one leg of the spectacles, which anchors the spectacles with a defined spatial orientation within the apparatus according to the disclosure.

The method according to the disclosure for measuring individual data of spectacles arranged in a measurement position provides for provision being made of a test structure and the test structure then being imaged by way of an imaging beam path, which passes through at least one of a left spectacle lens and a right spectacle lens of the spectacles arranged in the measurement position.

The refractive power distribution of the left spectacle lens and/or the right spectacle lens is then determined from the coordinates of the test structure and the captured image of the test structure and, typically, from the position of the left spectacle lens and/or the right spectacle lens relative to the test structure or the image of the test structure, for example by way of a computer program by means of image evaluation.

The test structure is typically two-dimensional. However, a test structure in the method according to the disclosure may also be three-dimensional. It should be noted that a three-dimensional test structure, for example a test structure in the form of an object with a spatial extent or a test structure in the form of a plurality of partial structures arranged in different planes that are held in a glass cube, provides the option of deducing the position of the spectacle lens in the measurement set-up, the ratio of the radii of curvature, the refractive index of a spectacle lens or the thickness thereof in spectacles which are arranged in the measurement position in the apparatus for measuring individual data of the spectacles, by combining through calculation light rays from different distances within the scope of the disclosure.

Here, in particular, an aspect of the disclosure is that the computer program ascertains the refractive power distribution in a coordinate system that is referenced to a coordinate system of the spectacles. Here, a coordinate system of the spectacles is understood to mean a coordinate system which is fixed in relation to the spectacles. Alternatively or additionally, it is also possible that the computer program of the computer unit determines the refractive power distribution in a coordinate system that is referenced to a coordinate system of the left and/or right spectacle lens.

The apparatus can also be designed as an image capture device for capturing a section of the spectacle frame of spectacles arranged in a measurement position, the section defining a coordinate system of the spectacles.

In particular, an aspect of the disclosure is that the image capture device captures the test structure in an image plane conjugate to the left spectacle lens and/or in an image plane conjugate to the right spectacle lens.

The image capture device typically comprises at least one camera, more typically at least two cameras and even more typically at least three cameras.

The image capture device may also have a first camera with a first image plane and a second camera with a second image plane, wherein the left spectacle lens of spectacles arranged in a measurement position is imageable in the first image plane and/or the right spectacle lens of spectacles arranged in a measurement position is imageable in the second image plane.

In an apparatus according to the disclosure, provision can also be made for the first camera to have a camera optical unit with an optical axis that passes through the left spectacle lens of spectacles, with a left spectacle lens, arranged in a measurement position, and for the second camera to have a camera optical unit with an optical axis that passes through the right spectacle lens of spectacles, with a right spectacle lens, arranged in a measurement position, wherein the optical axis of the camera optical unit of the first camera is parallel to the optical axis of the camera optical unit of the second camera.

It should be noted that, by way of an image capture device which facilitates capturing of sections of the spectacles with two, three or even more cameras with different optical axes in the apparatus for measuring individual data of spectacles, it is possible for the accuracy of the individual data of spectacles ascertained therewith to be increased.

Here, provision can also be made for the first camera to have a camera optical unit with an optical axis which passes through the left spectacle lens of spectacles, with a left spectacle lens, arranged in the measurement position, and for the second camera to have a camera optical unit with an optical axis which passes through the right spectacle lens of spectacles, with a right spectacle lens, arranged in a measurement position, wherein the optical axis of the camera optical unit of the first camera includes a stereo angle $\alpha$ with the optical axis of the camera optical unit of the second camera.

In an apparatus according to the disclosure, provision can furthermore be made for the first camera of the image capture device to have a camera optical unit with an optical axis which passes through the left spectacle lens of the spectacles arranged in the measurement position and for the third camera of the image capture device to have a camera optical unit with an optical axis which passes through the right spectacle lens of the spectacles arranged in the measurement position, wherein the optical axis of the camera optical unit of the first camera includes a stereo angle $\alpha'$ with the optical axis of the camera optical unit of the third camera and wherein the second camera, with the optical axis of the camera optical unit, respectively includes a stereo angle $\beta$ with the optical axes of the camera optical units.

The apparatus may also have an illumination device for providing illumination light with an illumination beam path which, along the optical axis of the camera optical unit of the first camera, passes through the left spectacle lens of spectacles, with a left spectacle lens, arranged in a measurement position and which, along the optical axis of the camera optical unit of the second camera, passes through the right spectacle lens of spectacles, with a right spectacle lens, arranged in a measurement position.

It is also an aspect of the disclosure that the image capture device has a camera with an image plane, wherein the left spectacle lens of spectacles arranged in a measurement position is imageable in the image plane and/or the right spectacle lens of spectacles arranged in a measurement position is imageable in the image plane. Here, in particular, it is a concept of the disclosure to provide an illumination device for providing illumination light with an illumination beam path that is directed, along the optical axis of the camera optical unit, onto spectacles arranged in a measurement position.

Here, it is advantageous if the apparatus contains an adjustable reflector which, in a first setting, reflects the illumination light which passes through the left spectacle lens and/or the right spectacle lens of spectacles arranged in a measurement position at least partly back through the left spectacle lens and/or the right spectacle lens and which, in a second setting that differs from the first setting, uncovers the imaging beam path for capturing the test structure, displayed on the display, with the image capture device. By way of example, this reflector can be arranged on a rotatable disk which is typically driven by motor and which has at least one sector that transmits light.

The disclosure also extends to a system for checking individual data of glazed spectacles by way of an apparatus as specified above. Such a system comprises an apparatus as specified above. In order to check individual data, individual data of spectacles are measured in the system and the measured data are compared to an intended value of corresponding data.

Moreover, the disclosure also extends to a computer program product having a computer program for providing a test structure and/or for capturing an image of the test structure by way of an imaging beam path which passes through a left and/or right spectacle lens of the spectacles arranged in the measurement position and/or for determining the refractive power distribution of a left spectacle lens and/or a right spectacle lens of spectacles, by way of a computer unit.

According to the disclosure, provision can be made, in a system for checking individual data, for providing a device for ascertaining the UV absorption behavior of a right and/or left spectacle lens of the spectacles. Within the scope of the disclosure, it is also possible in such a system to relate data, e.g., data captured by a camera, about a situation-dependent pupil orientation in a coordinate system that is fixed in relation to the spectacles of a spectacle wearer to the individual data, in particular spectacle-wearer-specific data, ascertained in an apparatus as specified above in order to be able to make a statement as to whether the left and/or right spectacle lens has been correctly inserted into the spectacles and whether it is seated correctly there. Alternatively or additionally, it is also possible in such a system to compare the intended data of a lens design with the refractive power distribution ascertained for a left and/or right spectacle lens of the spectacles to be able to make a statement as to whether the checked spectacles contain the correct spectacle lenses.

In one exemplary embodiment of the disclosure, the apparatus for measuring individual data of spectacles arranged in a measurement position, the spectacles having a left and/or a right spectacle lens, comprises at least:

a display for displaying a typically stationary test structure, optionally, an illumination device for producing UV light, optionally, a reflector which comprises at least one region that transmits visible light, typically illumination light, and at least one region which reflects light, typically illumination light, back, optionally, an illumination device for producing illumination light, an image capture device for capturing the typically stationary test structure, comprising at least one camera, typically at least two cameras, a computer unit with a computer program which determines at least the refractive power distribution for at least a section of the left spectacle lens and/or the right spectacle lens from the image of the typically stationary test structure captured by the image capture device and a known spatial orientation of the display relative to the image capture device and, optionally, a known spatial orientation of the spectacles relative to the image capture device.

In an exemplary embodiment of the disclosure, the apparatus for measuring individual data of spectacles arranged in a measurement position, the spectacles having a left and/or a right spectacle lens, comprises:

a display for displaying a typically stationary, typically two-dimensional test structure, optionally, a reflector which comprises regions that transmit and do not transmit light, typically visible light, typically illumination light, wherein the reflector is typically arranged between the display and the spectacles to be measured and is typically rotatable, optionally, an illumination device for producing illumination light, an image capture device for capturing the typically stationary, typically two-dimensional test structure, the image capture device comprising at least two cameras, and a computer unit with a computer program which determines at least the refractive power distribution for at least a section of the left spectacle lens and/or the right spectacle lens and optionally the spatial orientation of permanent markings in the left spectacle lens and/or right spectacle lens from the image of the typically stationary test structure captured by the image capture device and a known spatial orientation of the display relative to the image capture device.

In a further exemplary embodiment of the disclosure, the apparatus for measuring individual data of spectacles arranged in a measurement position, the spectacles having a left and/or a right spectacle lens, comprises:

a display for displaying a typically stationary, typically two-dimensional test structure, at least one mount for the spectacles and/or at least one mount for the right spectacle lens and/or at least one mount for the left spectacle lens, wherein these mounts are typically situated on the rest for the spectacles, an image capture device for capturing the typically stationary, typically two-dimensional test structure, comprising at least one camera, typically at least two cameras, and a computer unit with a computer program which determines at least the refractive power distribution for at least a section of the left spectacle lens and/or the right spectacle lens from the image of the typically stationary, typically two-dimensional test structure captured by the image capture device and a known spatial orientation of the display relative to the image capture device and also, optionally, a known spatial orientation of the spectacles relative to the image capture device.

BRIEF DESCRIPTION OF THE DRAWINGS

Below, exemplary embodiments of the disclosure, which are schematically depicted in the drawings, are described, wherein.

DETAILED DESCRIPTION OF EXEMPLARY EMBODIMENTS

Figure 1:
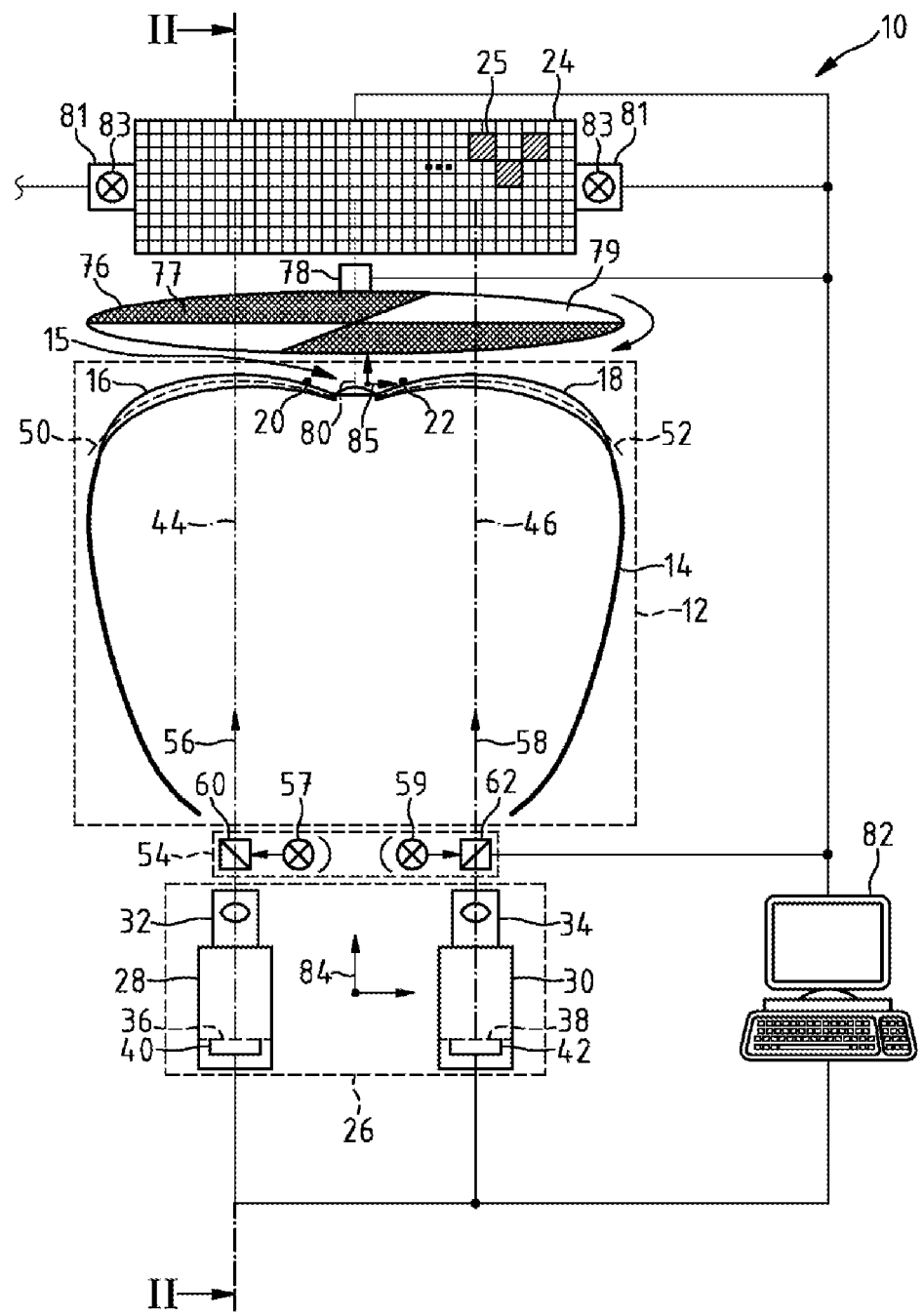
FIG. 1 shows a first apparatus for measuring individual data of spectacles by way of an image capture device having a first camera and a second camera.

The apparatus 10 shown in FIG. 1 serves to measure individual data of spectacles 14. The apparatus 10 has a receptacle 12 for arranging spectacles 14 to be measured in a measurement position on a mount 15 for the spectacles 14, the spectacles having a left spectacle lens 16 and a right spectacle lens 18. The mount 15 for the spectacles 14 has a mount 20 for the left spectacle lens 16 and a mount 22 for the right spectacle lens 18. In the measurement position, the left spectacle lens 16 rests on a mount 20 and the right spectacle lens 18 rests on a mount 22. The measurement position of spectacles 14 arranged in the receptacle 12 is uniquely defined by means of the mount 15.

It should be noted that, in the case of a modified embodiment of the apparatus 10, provision can also be made for a mount 15 which has one or more mounts, on which spectacles 14 arranged in the receptacle 12 rest with the frame or a frame part or a spectacle lens edge and a left spectacle lens 16 or right spectacle lens 18.

It should also be noted that, in a further, modified embodiment of the apparatus 10, provision can also be made for a mount 15, on which rimless spectacles rest with a spectacle lens edge of at least one spectacle lens of the spectacles 14.

In the apparatus 10, there is a two-dimensional display 24 for displaying a two-dimensional test structure 25. The apparatus 10 contains an image capture device 26. The image capture device 26 has a first camera 28 and a second camera 30. The first camera 28 and the second camera 30 each have a camera optical unit 32, 34 which is designed for capturing, in an image plane 36, 38 and by way of an image sensor 40, 42 in the first and second camera 28, 30, respectively, the test structure 25 that is displayed by means of the display 24. Here, the camera optical unit 32 of the first camera 28 has an optical axis 44 that passes through the left spectacle lens 16 of spectacles 14 arranged in the measurement position in the receptacle of the apparatus 10. Accordingly, the camera optical unit 34 of the second camera 30 has an optical axis 46 that extends through the right spectacle lens 18 of spectacles 14 arranged in the measurement position in the receptacle of the apparatus 10.

It should be noted that, in a modified embodiment of the apparatus 10, provision can also be made of a mount 15, on which the spectacles 14 rest with their frame or on which spectacles 14 to be measured in the apparatus 10 rest on their side facing the cameras 28, 30.

The optical axes of the first camera 28 and of the second camera 30 are parallel to one another in the apparatus 10. The mount 20 for the left spectacle lens 16 and the mount 22 for the right spectacle lens 18 in the apparatus 10 are situated at or near a reference surface 50, 52 passing through the spectacle lens 16 and the spectacle lens 18, respectively, the reference surface being approximately conjugate to the image plane 36, 38 of the first and second camera 28, 30, respectively. That is to say, the image plane 36 of the camera 28 is imaged in focus onto the reference surface 50 by means of the camera optical unit 32 and the image plane 38 of the camera 30 is imaged in focus onto the reference surface 52 by means of the camera optical unit 34.

The mount 20 and the mount 22 are arranged in the apparatus 10 in such a way that the markings according to the DIN EN ISO 8980-2:2004 standard, which, as a rule, are embodied as permanent engravings, lie on the left spectacle lens 16 and right spectacle lens 18 of the spectacles 14 in the conjugate planes 50 and 52, respectively, or near these planes.

Here, the depth of field of the camera optical units 32, 34 of the first camera 28 and second camera 30 in the apparatus 10 is matched to the orientation of the display 24 in such a way in this case that a pattern displayed therewith is still resolved in the image planes 36, 38 of the first camera 28 and the second camera 30. That is to say, a brightness distribution caused in the image planes 36, 38 of the first camera 28 and second camera 30 by the pattern displayed on the display 24 can be uniquely transformed, in a mathematically reversible manner, to the brightness distribution of the pattern displayed on the display 24.

It should be noted that the pattern displayed on the display 24 may be, for example, a point pattern, with the first camera 28 and second camera 30 respectively facilitating the determination of the center of the points in the pattern. It should also be noted that, in principle, line patterns can also be displayed on the display 24 instead of a point pattern, the optical power of the left spectacle lens 16 and right spectacle lens 18 of spectacles 14 arranged in the apparatus 10 then optionally being determined not only in absolute but also in phase-shifting terms on the basis of the line patterns, typically using deflectometric evaluation techniques.

Thus, by means of the image sensors 40, 42 in the cameras 28, 30, the image capture device 26 in the apparatus 10 is designed, firstly, to record the left spectacle lens 16 and right spectacle lens 18 of the spectacles 14 and, secondly, to capture the image of the test structure 25 displayed on the display 24 by way of an imaging beam path that is guided through the left spectacle lens 16 and the right spectacle lens 18.

To this end, the camera optical units 32, 34 are focused in the apparatus 10 on the spectacle lenses 16, 18 resting on the mount 20, 22 in the receptacle 12. However, in the process, the camera optical units 32, 34 ensure a depth-of-field range which ensures the in-focus capture of the test structure 25 in the image planes 36, 38 of the image sensors 40, 42 by way of an imaging beam path passing through the spectacle lenses 16, 18.

The apparatus 10 contains an illumination device 54 for providing illumination light having an illumination beam path 56, 58 which, along the optical axis 44, 46 of the camera optical unit 32 of the first camera 28 and the camera optical unit 34 of the second camera 30, respectively, passes through the left spectacle lens 16 and right spectacle lens 18 of the spectacles 14 to be measured. To this end, the illumination device 54 has light sources 57, 59 for producing illumination light. It has a first beam splitter 60, which is positioned between the camera optical unit 32 of the first camera 28 and the left spectacle lens 16 of spectacles 14 arranged in the measurement position, and a second beam splitter 62, which is situated between the camera optical unit 34 of the second camera 30 and the right spectacle lens 18 of spectacles 14 arranged in the measurement position.

There is a rotatably mounted reflector disk, which acts as an adjustable reflector 76, in the apparatus 10 between the two-dimensional display 24 and the receptacle 12 for measuring spectacles 14 arranged therein. The reflector disk has sectors 77 which reflect the illumination light of the illumination device 54 back to the first camera 28 and to the second camera 30 in the image capture device 26 through the left spectacle lens 16 and right spectacle lens 18, respectively. By contrast, the sectors 79 of the reflector disk transmit the light from the illumination device 54. The reflector disk can be moved around an axis of rotation 80 by way of a motor-driven drive 78.

The apparatus 10 moreover has a further illumination device 81 with light sources 83 for producing UV light. The illumination device 81 is designed for providing UV light with a beam path that passes through the left spectacle lens 16 and right spectacle lens 18 of spectacles 14 arranged in the measurement position in the receptacle 12 of the apparatus 10. The illumination device 81 serves to determine, by means of the image sensors 40, 42 of the cameras 28, 30, the UV absorption behavior of the spectacle lenses 16, 18 of spectacles arranged in the receptacle 12 of the apparatus 10.

In order to control the display 24 and the image capture device 26, and also the illumination device 54, the further illumination device 81 and the movement of the reflector disk in the apparatus 10, the latter has a computer unit 82. The computer unit 82 contains a computer program which, in a coordinate system 84 that is fixed in relation to the apparatus 10 and for at least one section of the left spectacle lens 16 and for at least one section of the right spectacle lens 18, determines a refractive power distribution that is referenced to a coordinate system 85 of the spectacles 14 from the image of the spectacles 14 and the test structure 25 captured by way of the image capture device 26 and the relative position of the display 24 and image capture device 26 and the relative position of image capture device 26 and the mount 20 for the left spectacle lens 16 and the relative position of the image capture device 26 and the mount 22 for the right spectacle lens 18.

Figure 2:
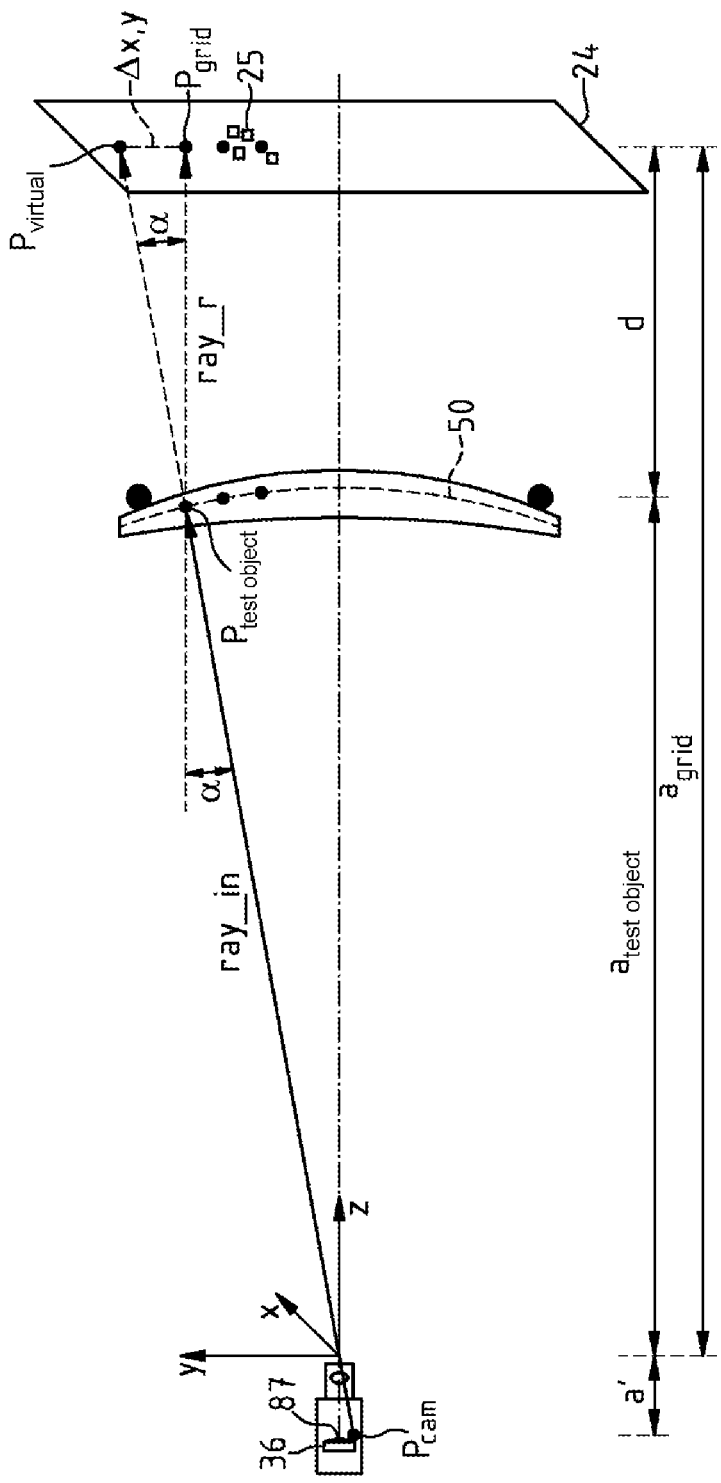
FIG. 2 shows, in a section, a partial view of the apparatus from FIG. 1.

FIG. 2 is a partial view of the apparatus 10 in the form of a schematic section along the line II-II from FIG. 1 and serves to explain how the computer program in the computer unit 82 determines the refractive power distribution for the left spectacle lens 16 and for the right spectacle lens 18 in the apparatus 10.

The computer program in the computer unit 82 contains an algorithm which calculates the local distortion of the test structure 25 from the difference image of the image captured with the camera 28 when no spectacles are arranged in the receptacle 12 of the apparatus 10 from FIG. 1 and when spectacles 14 are situated there. Then, deflection angles for the light rays imaging the test structure 25 are determined from the calculated distortion. Thereafter, the computer program ascertains the local deflection angle $\alpha$ of the light rays ray_r, which reach the camera 28 or 30 through a spectacle lens 16, 18 from the individual points $P_{grid}$ of the test structure 25 displayed on the display 24, from the distortion of the image 87 of the test structure 25 displayed on the display 24 in the image plane 36 of the camera 28 and the known relative position of the spectacle lens 16 with respect to the camera 28 and in relation to the display 24. Here, the reference surfaces 50, 52 are respectively used as virtual planes of refraction. The computer program in the computer unit 82 accordingly evaluates the distortion of the image of the test structure 25 displayed on the display 24 in the image plane 38 of the camera 30. Thus, this deflectometric evaluation method exploits the fact that the spatial coordinates in x, y, z of each point $P_{grid}$ displayed on the display 24 are known.

The computer program calculates the centroid of each point $P_{cam}$ in the image plane 36, 38 of a camera 28, 30. Then, the computer program ascertains centroid light rays from these points $P_{cam}$ in the form of vectors ray_in. The computer program intersects the centroid light rays ray_in with the plane of the display 24. In this way, the computer program calculates a multiplicity of virtual observation points $P_{virtual}$ of the test structure 25 in the plane of the display 24.

The offset $\Delta=P_{grid}-P_{virtual}$ of a point $P_{grid}$ displayed on the display 24 from the corresponding virtual observation point $P_{virtual}$ describes the shift of the point $P_{grid}$ caused by the optical power of the spectacle lens 16 or 18.

In order to determine the optical power of the spectacle lens 16 or spectacle lens 18, the computer program ascertains the location $P_{test\ object}$, at which a light ray emanating from the display 24 passes through a corresponding spectacle lens 16, 18, from the known relative position of the mounts 20, 22 in the apparatus 10 in relation to the display 24 and the image planes 36, 38 of the cameras 28 and 30, respectively. Then, the local ray deflections for light rays which pass through the spectacle lenses 16, 18 of spectacles 14 arranged in the apparatus 10 are respectively determined in the computer unit 82 from the three points $P_{test\ object}$, $P_{virtual}$, and $P_{grid}$ by way of the computer program. From this, the computer program then ascertains the refractive power distribution which corresponds to local beam deflections of these light rays caused by the spectacle lens 16 or the spectacle lens 18.

Thus, in the apparatus 10, the refractive power distribution of the left spectacle lens 16 and/or the right spectacle lens 18 is determined from the coordinates of the test structure 25 and the captured image of the test structure 25 and from the position of the left spectacle lens 16 and/or the right spectacle lens 18 relative to the test structure 25 or the image of the test structure 25.

Here, the computer program typically also takes account of parameters of the spectacle lenses 16, 18 of spectacles 14 to be measured, the parameters being specific to the spectacle lenses 16, 18, for example the edge parameter thereof, the ratio of the radii, the central thickness, the edge thickness or else radii gradations. Such parameters may also contain information about the center and edge thickness of a spectacle lens which has a known diameter. A parameter that is specific to the spectacle lens 16, 18 may also be the edge thickness that is defined by way of the frame of spectacles in which a spectacle lens is inserted. A parameter that is specific to a spectacle lens 16, 18 may also be the radii of curvature of an optically effective surface.

This is because the more accurately the form of a spectacle lens 16, 18 is known in advance, the more accurately the overall refractive power distribution and the exact surface topography can be determined for the spectacle lens 16, 18 by means of the computer program in the computer unit 82.

It should be noted that the apparatus 10 also facilitates a capture of stereometric data relating to the spectacle lenses 16, 18 arranged in the spectacles 14 by way of the camera pair formed by the first camera 28 and the second camera 30, it being possible to ascertain, firstly, information about the form, e.g., the ratio of radii of curvature of the front side and rear side or information about the glass thickness, and, secondly, information about the position of a spectacle lens 16, 18 in spectacles 14 and/or the refractive index of the material of the spectacle lens from the stereometric data.

Figure 3:
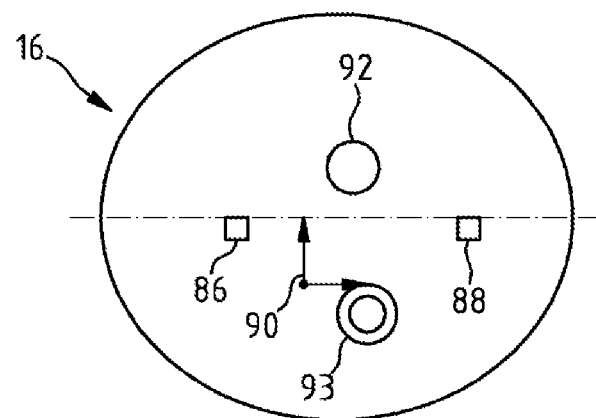
FIG. 3 shows a spectacle lens of progressive spectacles with markings that define a local coordinate system.

FIG. 3 shows a spectacle lens 16 of progressive spectacles having markings 86, 88 corresponding to the DIN EN ISO 8980-2:2004 standard, the markings defining the local spectacle lens coordinate system 90. Moreover, the orientation of the near reference point 92 and of the distance reference point 93 have been made visible on the spectacle lens 16.

In order to ensure that lens specifications on a spectacle lens do not impair the vision of the spectacle wearer, the lens specifications applied on an uncut spectacle lens on the part of the producer are removed to the greatest possible extent by an optician before the lens is inserted into a spectacle frame. As a consequence, it may be possible to ascertain e.g., the orientation of the near and distance reference points 92, 93 of a spectacle lens 16 only with comparatively high outlay after insertion into the frame of spectacles 14.

The markings 86, 88 defining the local spectacle lens coordinate system 90 are permanent markings and act as phase objects for the light which are only visible with difficulty by the naked eye.

Figure 4:
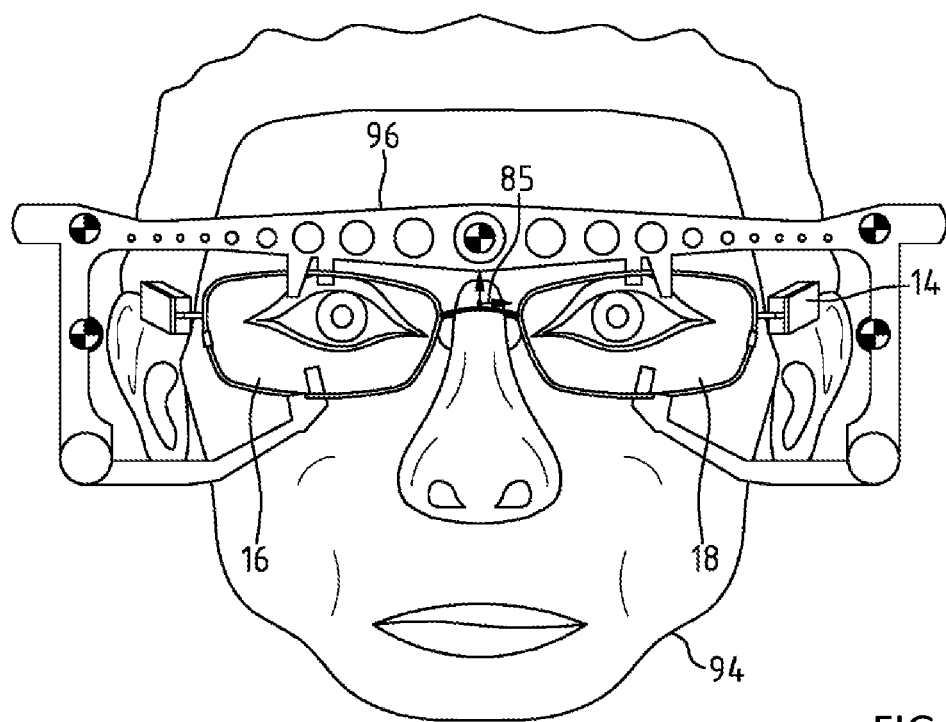
FIG. 4 shows spectacles with a measurement leg for determining the pupil orientation of an observation person.

FIG. 4 shows an observer 94 with spectacles 14 and a measuring leg 96 fastened thereto, the measuring leg serving to determine the fitting parameters for the left spectacle lens 16 and right spectacle lens 18 in the form of the interpupillary distance and the required orientation of the near reference point 92 and of the distance reference point 93 in a coordinate system 85 that is fixed in relation to the spectacles 14.

By way of example, these fitting parameters can be determined by virtue of the observer 94 being recorded with a camera (not shown here) when looking into the vicinity and looking into the distance, and the orientation of the pupils then being ascertained by means of image processing in the coordinate system 85 that is fixed in relation to the spectacles 14.

The apparatus 10 shown in FIG. 1 is designed to capture the orientation of the markings 86, 88 and, in the process, reference the spectacle lens coordinate system 90 that is defined by these markings 86, 88 to the coordinate system of the spectacles 14.

The illumination light of the illumination device 54 in the apparatus 10, guided along the optical axes 44, 46 of the camera optical units 32, 34 shown in FIG. 1 passes through the left spectacle lens 16 and right spectacle lens 18 of spectacles 14 arranged in the receptacle 12 of the apparatus 10. This illumination light is reflected at the light-reflecting sectors 77 of the reflector disk and then reaches through the left or right spectacle lens 16, 18 to the image planes 36, 38 of the first camera 28 and second camera 30, respectively, via the beam splitters 60, 62.

Figure 5:
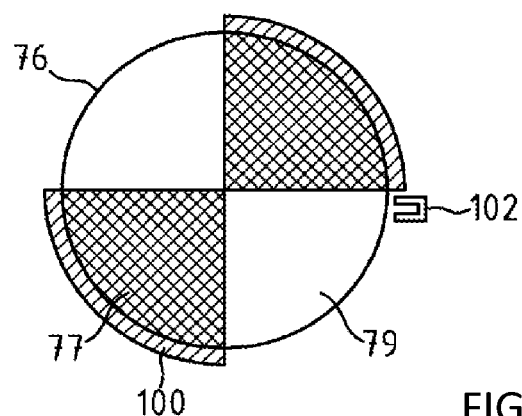
FIG. 5 shows an embodiment of a reflector disk in an apparatus for measuring individual data of spectacles.

FIG. 5 shows an embodiment of the rotatable reflector disk that can be used in the apparatus of FIG. 1. In the sections of the light-reflecting sectors 77, the reflector disk has markings 100 that extend in arcuate fashion. In the apparatus 10, the position of these markings 100 is captured by a photoelectric sensor 102 which is connected to the computer unit 82 and which acts as a rotation sensor. This rotation sensor serves for synchronizing the image capture by means of the cameras 28, 30 in the image capture device 26 on the basis of trigger signals which indicate the rotational position of the reflector disk.

The phase object of the markings 86, 88 on the spectacle lenses 16, 18 has as a consequence that the light is scattered more strongly thereon than in the remaining regions of the spectacle lenses 16, 18. As described in DE 103 33 426 B4, paragraph [0024], to which reference is made herewith in the entirety thereof and the disclosure of which is incorporated into the description of this application, these can then be captured by means of the first camera 28 or second camera 30 as dark structures on a bright background.

By virtue of a section of the spectacle frame of the spectacles 14, from which the coordinate system 85 of the spectacles 14 can be determined by means of image evaluation, being captured by means of the first camera 28 or second camera 30, the apparatus 10 is able to reference this coordinate system 85 to the coordinate system 84 of the apparatus 10.

When the light-reflecting sectors 77 of the reflector disk at least partly uncover the left spectacle lens 16 and right spectacle lens 18 of spectacles, a test structure 25 displayed on the display 24 can be identified by means of the cameras 28, 30.

By evaluating, by means of the computer unit 82, the images of the cameras 28, 30 depending on the rotational position of the reflector disk, it is possible to determine, in the coordinate system 84 of the apparatus 10, the distribution of the refractive power of the left spectacle lens 16 and right spectacle lens 18 of spectacles 14 arranged in the receptacle 12. Moreover, as a result, it is possible by means of the apparatus 10 to reference the spectacle lens coordinate system 90 for the left spectacle lens 16 and right spectacle lens 18 of the spectacles 14 to the coordinate system 84 of the apparatus 10 and to the coordinate system 85 of the spectacles 14.

In an alternative embodiment of the apparatus 10, the cameras 28, 30 have adjustable camera optical units 32, 34, which are focused, alternately and depending on the rotational position of the reflector disk, on the display 24 and the left spectacle lens 16 and right spectacle lens 18 of the spectacles 14 by means of an autofocus system. This measure ensures the in-focus imaging of the test structure 25 displayed on the display 24 and of the markings 86, 88 on the left spectacle lens 16 and right spectacle lens 18 of the spectacles 14.

Figure 6A:
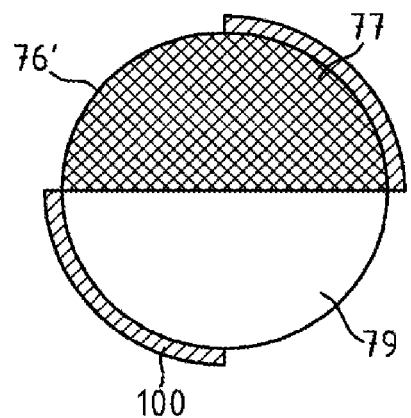
FIG. 6A shows an exemplary embodiment of a reflector disk in an apparatus for measuring individual data of spectacles.
Figure 6B:
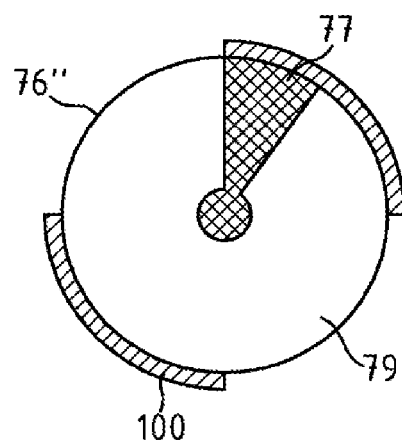
FIG. 6B shows another exemplary embodiment of a reflector disk in an apparatus for measuring individual data of spectacles.

FIG. 6A and FIG. 6B show alternative embodiments of an adjustable reflector 76', 76" having a reflector disk for an apparatus 10, by means of which individual data of spectacles 14 can be measured.

Figure 7:
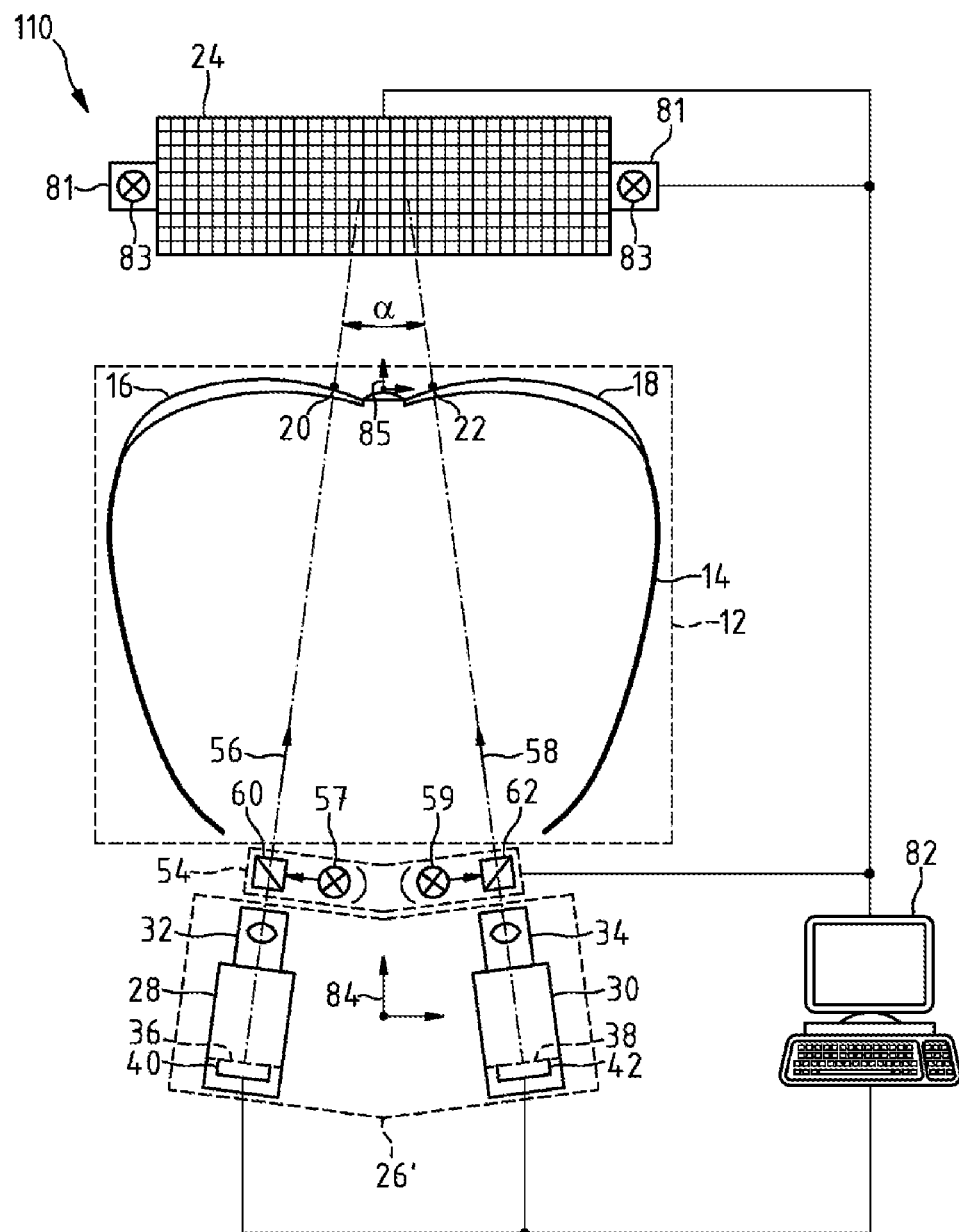
FIG. 7 shows a second apparatus for measuring individual data of spectacles.

FIG. 7 shows a second apparatus 110 for measuring individual data of spectacles. As far as the components of the apparatus 110 correspond to the components of the apparatus 10 described above, they are identified by the same numerals as reference signs.

Unlike the apparatus 10, the cameras 28, 30 of the image capture device 26' have optical axes 44, 46 inclined in relation to one another in this case, the optical axes forming an acute angle α. By means of the image capture device 26', it is possible, in this case, to capture on the image planes of the image sensors 40, 42 of the cameras 28, 30 mutually overlapping sections of the spectacle lenses 16, 18 of spectacles arranged in the receptacle 12 of the apparatus 110. In order to capture the markings 86, 88, described on the basis of FIG. 3, on a spectacle lens 16, 18, a stripe pattern is displayed on the display 24, the stripe pattern having a varying spatial phase and extending in different directions. Then, as described in e.g., U.S. Pat. No. 8,081,840 B2, in particular in column 5, lines 10 to 50, to which reference is made herewith in the entirety thereof and the disclosure of which is incorporated into the disclosure of this application, a deflectometric phase amplitude image is calculated in the computer unit 82 from the image of this stripe pattern captured by means of the cameras 28, 30. This calculated phase amplitude image has a contrast which is so great that the data record of these calculated phase amplitude images contains, in particular, the information regarding the position of the markings.

Figure 8:
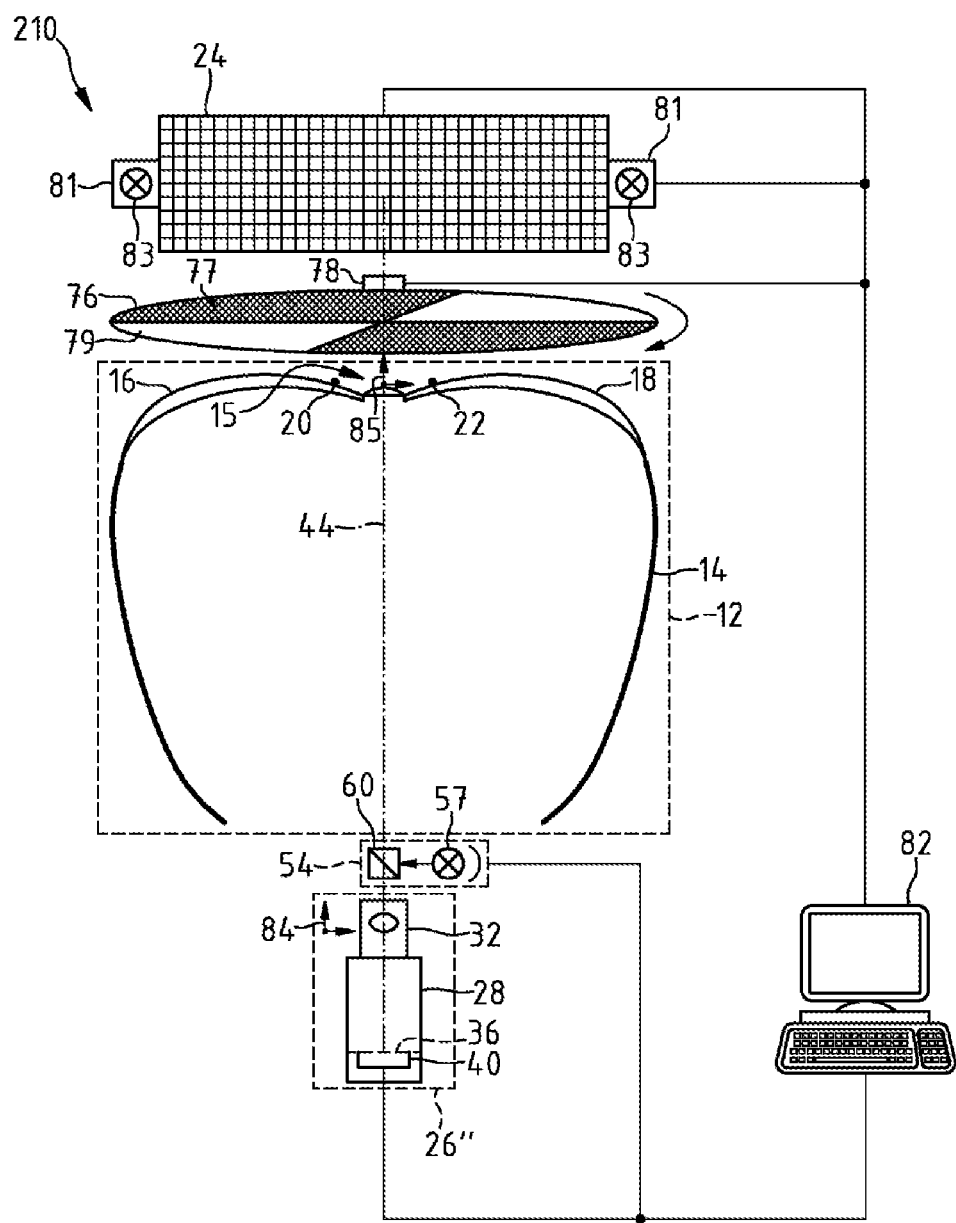
FIG. 8 shows a third apparatus for measuring individual data of spectacles by way of an image capture device containing only one camera.

FIG. 8 shows a third apparatus 210 for measuring individual data of spectacles 14. As far as the components of the apparatus 210 correspond to the components of the apparatus 10 described above, they are identified by the same reference numerals.

The apparatus 210 has an image capture device 26" in which there is only one camera 28 with a camera optical unit 32 having an optical axis 44 which passes through spectacles 14 arranged in the receptacle 12 of the apparatus 210 between the first spectacle lens 16 and the second spectacle lens 18.

Figure 9:
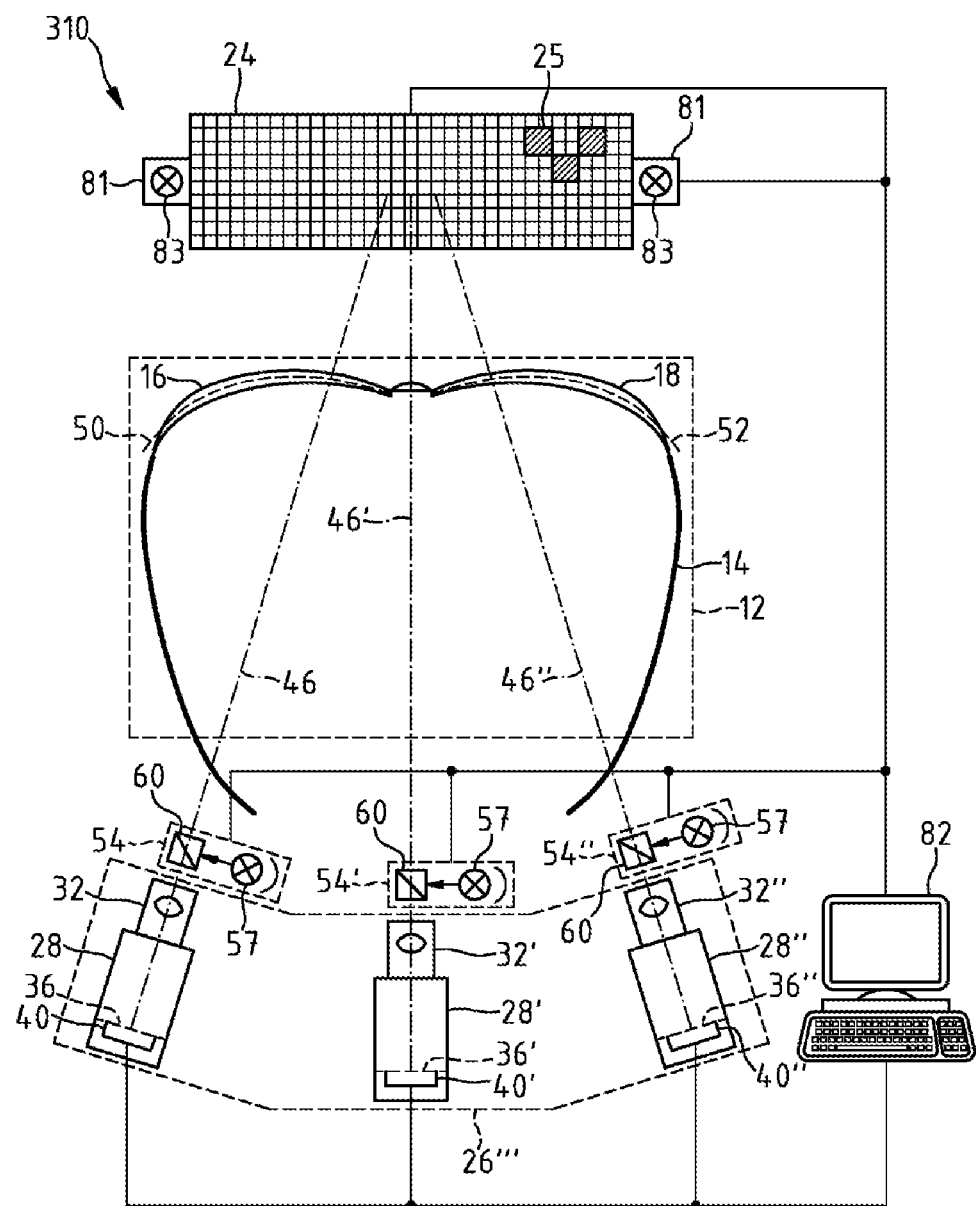
FIG. 9 shows a fourth apparatus for measuring individual data of spectacles by way of an image capture device having a first camera, a second camera, and a third camera.

FIG. 9 shows a fourth apparatus 310 for measuring individual data of spectacles 14. As far as the components of the apparatus 310 correspond to the components of the apparatus 10 described above, they are identified by the same reference numerals.

The apparatus 310 has a receptacle 12 for arranging spectacles 14 to be measured in a measurement position for the spectacles 14, the spectacles having a left spectacle lens 16 and a right spectacle lens 18.

In the apparatus 310, there is a two-dimensional display 24 for displaying a two-dimensional test structure 25.

The apparatus 310 has an image capture device 26''', in which there are three cameras 28, 28', and 28". The cameras 28, 28', 28" each contain a camera optical unit 32, 32', 32" which is designed for capturing, in an image plane 36, 36', 36" and by way of an image sensor 40, 40', 40", the test structure 25 that is displayed by means of the display 24. The camera optical units 32, 32', 32" have optical axes 46, 46', and 46" that are inclined in relation to one another. On the side of the camera optical units 32, 32', and 32" that faces the display 24, there respectively is an illumination device 54, 54', 54" having a beam splitter 60 through which the optical axes 46, 46', and 46" pass and a light source 57 for impinging the spectacles 14 that are arranged in the receptacle 12 with illumination light. The camera optical units 32, 32', and 32" in the apparatus 310 each have focal planes which intersect the reference surfaces 50, 52 which pass through the right spectacle lens 18 and/or left spectacle lens 16 of the spectacles 14 or which abut the left spectacle lens 16 or right spectacle lens 18 of the spectacles 14 or abut the reference surfaces 50, 52.

Here, the depth of field of the camera optical units 32, 32', and 32" in the apparatus 310 is matched to the orientation of the display 24 in such a way in this case that a pattern displayed therewith is still resolved in the image planes 36, 36', and 36". That is to say, a brightness distribution caused in the image planes 36, 36', and 36" of the first camera 28, second camera 28', and third camera 28" by the pattern displayed on the display 24 can be uniquely transformed, in a mathematically reversible manner, to the brightness distribution of the pattern displayed on the display 24.

Figure 10:
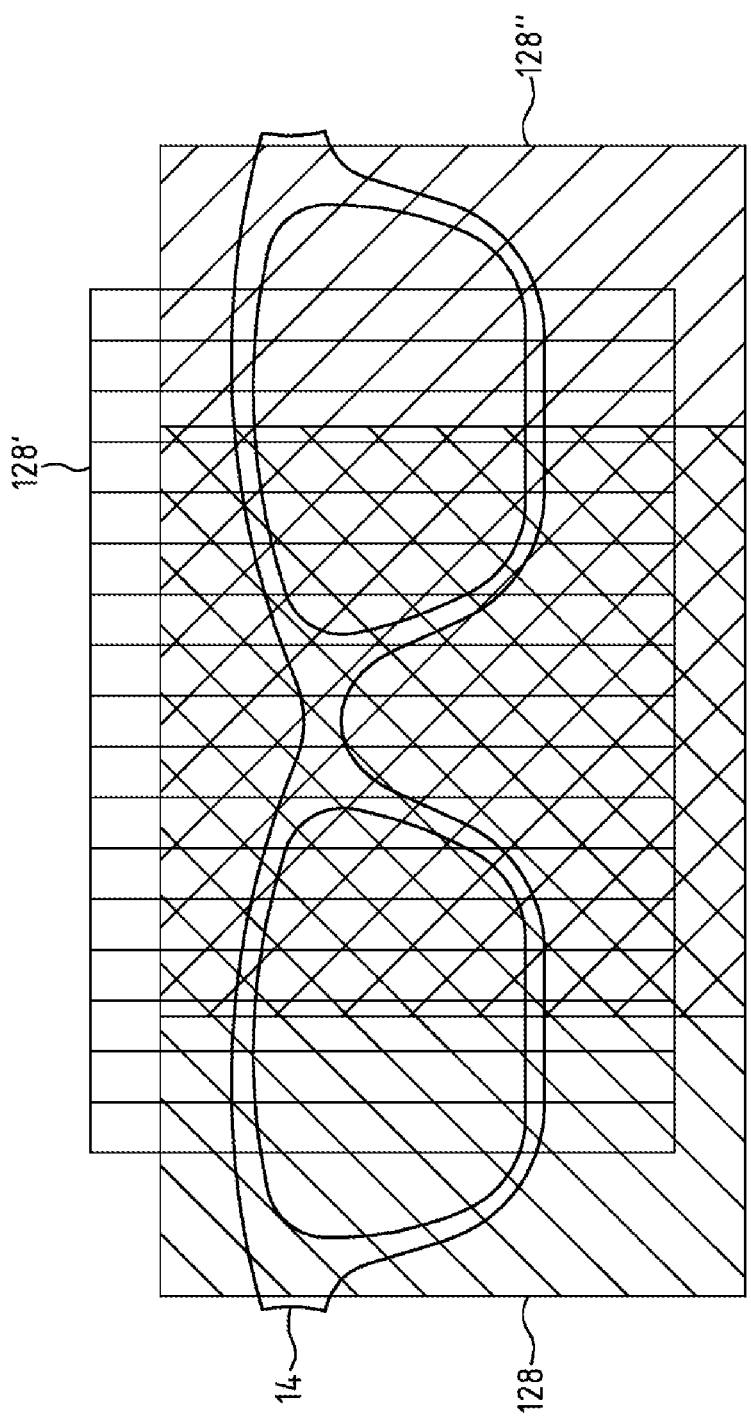
FIG. 10 shows the image fields of the first camera, second camera, and the third camera with spectacles to be measured.

In FIG. 10, it is possible to see the image field 128 of the first camera 28, the image field 128' of the second camera 28', and the image field 128" of the third camera 28" along with spectacles 14 arranged in the apparatus 310 for measurement purposes.

The image fields 128, 128', and 128" of the cameras 28, 28', and 28" overlap and completely cover the spectacle lenses 16, 18 of spectacles 14 arranged in the receptacle 12 of the apparatus 310 and ensure that a marking 86, 88 that is embodied on a spectacle lens 16, 18 as a permanent marking lies in the mutually overlapping image fields 128, 128' or 128', 128" of at least two cameras 28, 28' on the one hand and 28' and 28" on the other hand.

In the apparatus 310, there is a computer unit 82 which contains a computer program for ascertaining the spatial orientation of the left spectacle lens 16 and right spectacle lens 18 by means of image evaluation and triangulation from the image data captured by the cameras 28, 28', 28". The computer unit 82 in the apparatus 310 is a device for determining the spatial orientation relative to the image capture device 26' of spectacles 14 arranged in the receptacle 12. Hence, it is advantageously possible in the apparatus 310 to automatically trigger measuring the spectacles 14 by arranging spectacles 14 in the receptacle 12 of the apparatus 310 and to determine the spatial orientation of the left spectacle lens 16 and right spectacle lens 18 relative to the image capture device 26'.

Figure 11:
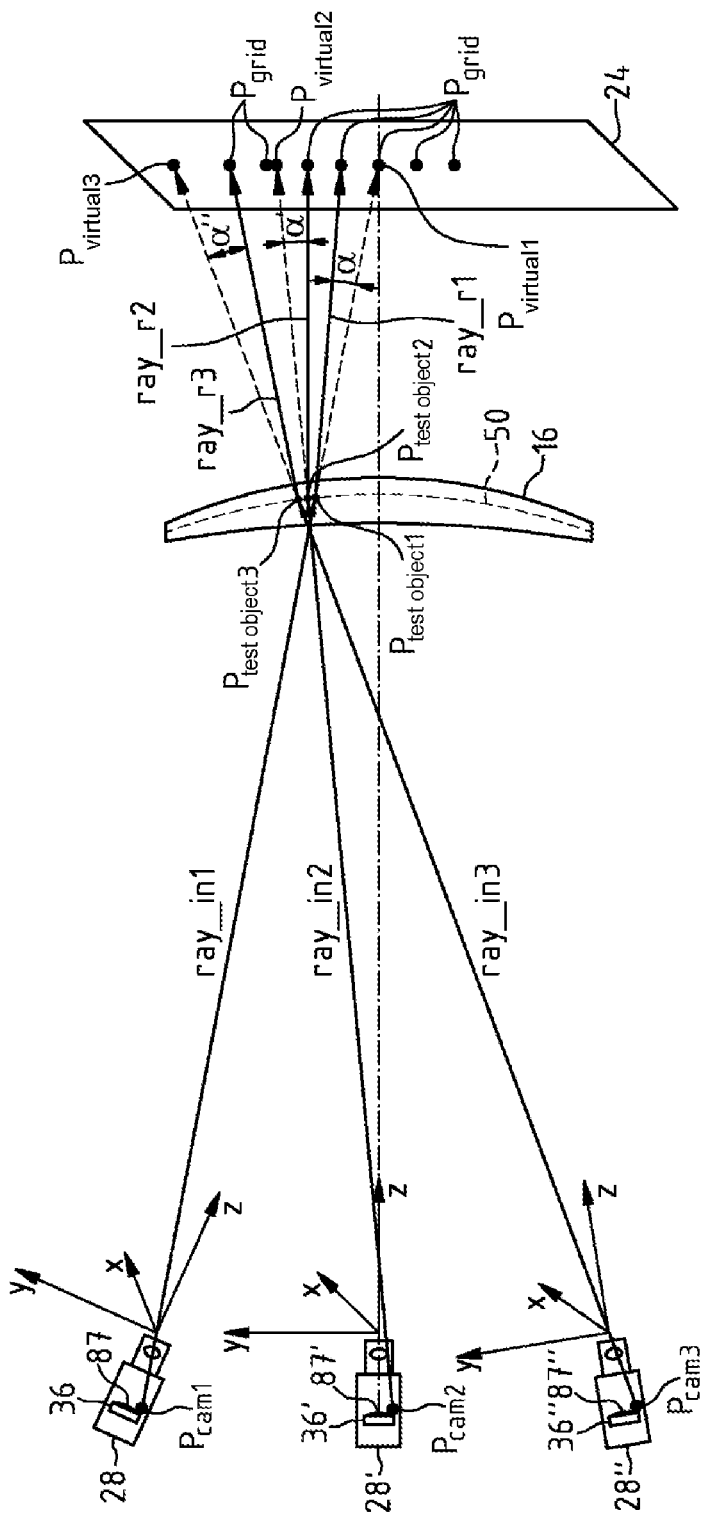
FIG. 11 shows, in a section, a partial view of the apparatus from FIG. 9.

FIG. 11 is a partial view of the apparatus from FIG. 9. It serves to explain how the computer program in the computer unit 82 determines the refractive power distribution for the left spectacle lens 16 and the right spectacle lens 18 in the apparatus 10.

The computer program in the computer unit 82 in the apparatus 310 also contains an algorithm which calculates the local distortion of the test structure 25 from the difference image of the image captured with the camera 28 when no spectacles are arranged in the receptacle 12 of the apparatus 310 from FIG. 9 and when spectacles 14 are situated there. Then, deflection angles for the light rays imaging the test structure 25 are determined from the calculated distortion. Here, the reference surfaces 50, 52 are set as virtual refractive planes, which are curved in the present case, in the computer program. Then, the computer program ascertains local deflection angles $\alpha$, $\alpha'$ and $\alpha''$ of the light rays ray_r1, ray_r2, and ray_r3, which reach the camera 28, 28', or 28" through a spectacle lens 16, 18 from the individual points $P_{grid}$ of the test structure 25 displayed on the display 24, from the distortion of the images 87, 87', and 87" of the test structure 25 displayed on the display 24 in the image planes 36, 36', and 36" of the cameras 28, 28', and 28" and the known relative position of the spectacle lens 16 with respect to the cameras 28, 28', and 28" and in relation to the display 24. Thus, this deflectometric evaluation method exploits the fact that the spatial coordinates in x, y, z of each point $P_{grid}$ displayed on the display 24 are known.

The computer program in the computer unit 82 then calculates centroid light rays in the form of vectors ray_in1, ray_in2, and ray_in3, as described on the basis of the apparatuses 10, 110, and 210 described above. The computer program intersects the centroid light rays ray_in1, ray_in2, and ray_in3 with the plane of the display 24. In this way, the computer program calculates a multiplicity of virtual observation points $P_{virtual}$ of the test structure 25 in the plane of the display 24.

The offset $\Delta = P_{grid} P_{virtual}$ of a point $P_{grid}$ displayed on the display 24 from the corresponding virtual observation point $P_{virtual}$ describes the shift of the point $P_{grid}$ caused by the optical power of the spectacle lens 16 or 18.

In order to determine the optical power of the spectacle lens 16 or spectacle lens 18, the computer program then ascertains the location $P_{test\ object}$, at which a light ray emanating from the display 24 passes through a corresponding spectacle lens 16, 18, from the known relative position of the left spectacle lens 16 and right spectacle lens 18 in the apparatus 310 in relation to the display 24 and the image planes 36, 36', and 36" of the cameras 28, 28', and 28". Thereupon, the local ray deflections for the light rays which pass through the spectacle lenses 16, 18 of spectacles 14 arranged in the apparatus 310 are once again respectively determined in the computer unit 82 from the three points $P_{test\ object}$, $P_{virtual}$ and $P_{grid}$ by way of the computer program. From this, the computer program then ascertains the refractive power distribution which corresponds to local beam deflections of these light rays caused by the spectacle lens 16 or the spectacle lens 18.

Thus, in the apparatus 310, the refractive power distribution of the left spectacle lens 16 and/or the right spectacle lens 18 is once again determined from the coordinates of the test structure 25 and the captured image of the test structure 25 and optionally from the position of the left spectacle lens 16 and/or the right spectacle lens 18 relative to the test structure 25 or the image of the test structure 25.

It should be noted that the measurement accuracy for determining the refractive power distribution of a left spectacle lens 16 and a right spectacle lens 18 in spectacles 14 can be increased further, in an apparatus for measuring individual data of spectacles, by virtue of using not only three, but four, five, six or even more cameras with camera optical units that have optical axes inclined in relation to one another.

The apparatuses 10, 110, 210, and 310 described above can be used in a system for checking individual data of glazed spectacles to determine whether the centration of a spectacle lens in the frame of spectacles corresponds with the spectacle-wearer-specific fitting parameters, ascertained during the refraction and the fitting, in respect of the interpupillary distance R/L and the height of the pupils. By way of example, such a system can contain a device for evaluating the arrangement of a right spectacle lens and/or a left spectacle lens of the spectacles, taking into account a measured refractive power distribution in a coordinate system that is fixed in relation to the spectacles. Such a system may also have a device for comparing a spatially resolved refractive power of the right spectacle lens and/or left spectacle lens of the spectacles with intended values.

Figure 12:
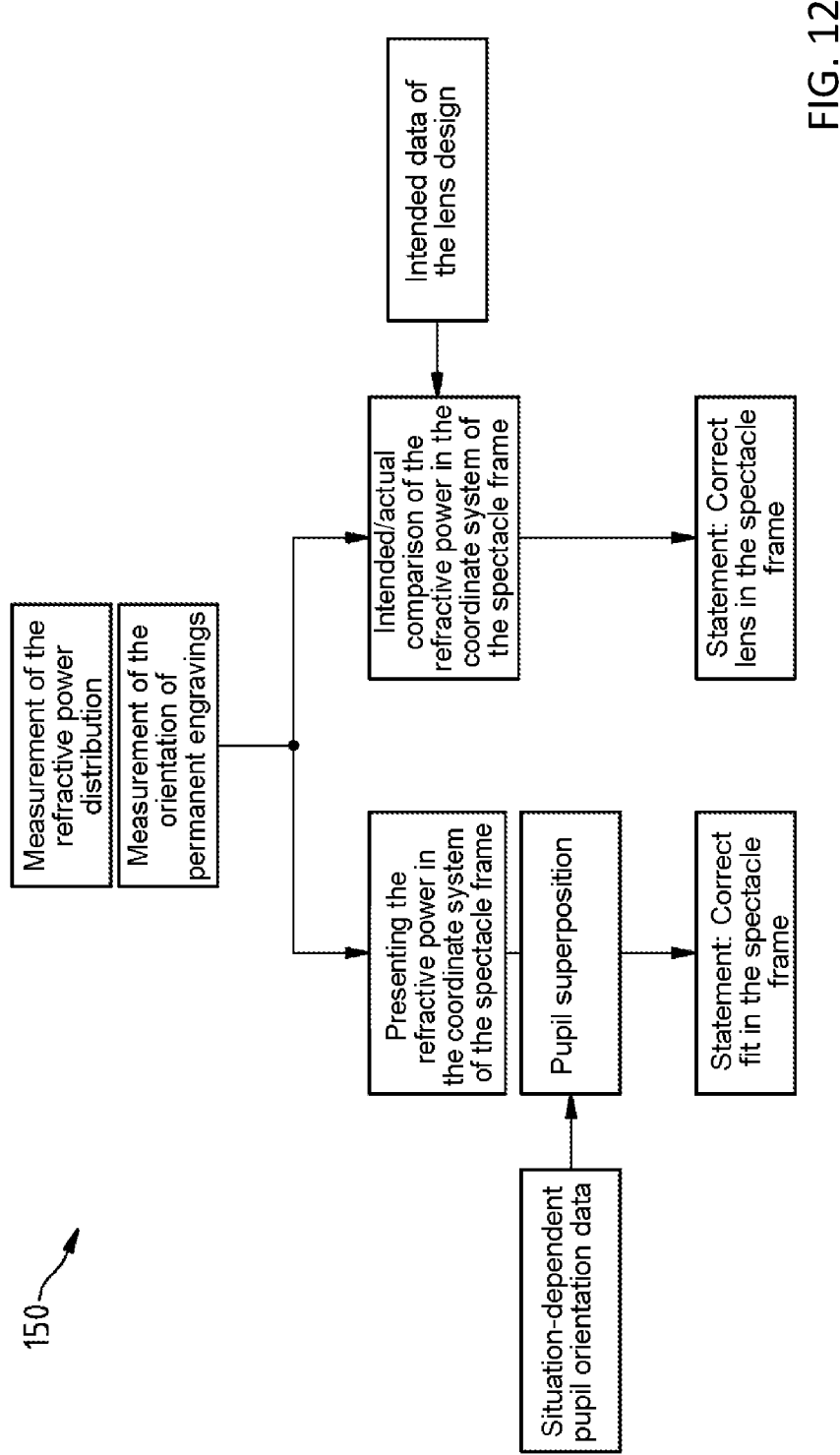
FIG. 12 shows a flowchart regarding the measurement of individual data of spectacles by way of an apparatus according to the disclosure.

The flowchart 150 shown in FIG. 12 serves to explain how the refractive power distribution and capturing the spatial orientation of permanent engravings on spectacle lenses 16, 18 by measuring spectacles 14 arranged in the apparatus 10, 110, 210, and 310 can be combined in such a system with data about a situation-dependent pupil orientation of the eyes of a spectacle wearer and with the information of intended data relating to a lens design in such a system.

Using this, it is possible to ascertain whether the corresponding lenses were incorporated in non-reversed fashion and/or whether they were possibly interchanged. Such a system renders it possible to check whether the axis position of the lenses in the spectacle frame is correct. Such a system also renders it possible to find out whether the measurement values correspond with the provided values. Such a system also allows a statement to be made as to whether a spectacle lens has been incorporated into the frame of spectacles in a correct and tension-free manner. Using such a system, it is possible to identify whether a power distribution measured therein corresponds to the expected power distribution over the area, whether the pupil orientation fits the refractive power distribution of the spectacle lens, and whether the refractive power distribution of the spectacle lens is matched to the viewing direction-dependent or situation-dependent pupil orientation.

It should be noted that, in a system for checking individual data of spectacles, e.g., spectacle-wearer-specific fitting data, containing one of the apparatuses 10, 110, 210, or 310 described above, it is also possible to make a further qualitative statement about the quality of manufactured spectacles from the superposition of the measurement data with an image of the adaptation. The image data necessary to this end then exist from the recordings which the optician has obtained when measuring the centering data, for example with the aid of a Relax Vision terminal, as described in, to which reference is made herewith and the disclosure of which is incorporated in the entirety thereof into the disclosure of this application. By way of the superposition, it is possible to quickly make a statement about the correct fit of the lens in the frame. It is advantageous if such images of the pupil orientation for various viewing positions, for example, distance viewing position, near viewing position and the transition region, or different viewing situations, such as reading, driving, phoning, working, making music, etc. are evaluated.

Here, what should be noted, in particular, is that statements about the spherical power, the cylinder, and the prism suffice in the simplest case for a statement as to whether the correct lens was inserted into the frame. In order to be able to make more in-depth statements about the power distribution, for example in the case of individual designs, in particular in the case of progressive spectacles, intended data records of the spectacle lenses are required. If these are available, a statement about the correspondence of the spectacle lens design can be made by way of an appropriate intended-actual comparison.

Solely determining the surface refractive powers for the spectacle lens of spectacles in such a system renders it possible to make a reasoned statement as to whether the profile of the surface refractive powers is matched to the orientation of the pupils of an observation person, particularly in the case of different viewing directions.

In conclusion, the following, in particular, should be noted: The disclosure relates to an apparatus 10, 110, 210, 310 and a method for measuring individual data of spectacles 14 arranged in a measurement position, the spectacles having a left and/or a right spectacle lens 16, 18. The apparatus 10, 110, 210, 310 has a display 24 for displaying a test structure 25. The apparatus 10, 110, 210, 310 contains an image capture device 26 for capturing the test structure 25 with an imaging beam path which passes through the left spectacle lens 16 and/or the right spectacle lens 18 of the spectacles 14. The apparatus 10, 110, 210, 310 has a computer unit 82 with a computer program which determines a refractive power distribution for at least a section of the left spectacle lens 16 and/or the right spectacle lens 18 from the image of the test structure 25 captured by the image capture device 26, 26', 26", 26''' and a known spatial orientation of the display 24 relative to the image capture device 26, 26', 26", 26''' and also typically a known spatial orientation of the spectacles 14 relative to the image capture device 26, 26', 26", 26''. In order to measure individual data of spectacles 14, the spectacles 14 are arranged in a measurement position. Then, according to the disclosure, a test structure 25 is provided. Then, the image of the test structure 25 is captured by way of an imaging beam path which passes through a left and/or right spectacle lens 16, 18 of the spectacles 14 arranged in the measurement position. The refractive power distribution of the left spectacle lens 16 and/or the right spectacle lens 18 is then determined from the coordinates of the test structure 25 and the captured image of the test structure 25.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS

10, 110, 210, 310 Apparatus
12 Receptacle
14 Spectacles
15 Mount for spectacles
16 Left spectacle lens
18 Right spectacle lens
20 Mount—left spectacle lens
22 Mount—right spectacle lens
24 Display
25 Test structure
26, 26', 26", 26''' Image capture device
28, 28', 28", 30 Camera
32, 32', 32", 34 Camera optical unit
36, 36', 36", 38 Image plane
40, 40', 40", 42 Image sensor
44, 46, 46', 46" Optical axis
50, 52 Reference surface
54, 54', 54" Illumination device
56, 58 Illumination beam path
57, 59 Light source
60, 62 Beam splitter
76, 76', 76" Adjustable reflector (reflector disk)
77 Sectors
78 Motor-driven drive
79 Sectors
80 Axis of rotation
81 Illumination device
82 Computer unit
83 Light sources
84, 85 Coordinate system
86, 88, 100 Marking
87, 87', 87" Image
90 Spectacle lens coordinate system
92 Near reference point
93 Distance reference point
94 Observer
96 Measuring leg
102 Photoelectric sensor
128, 128', 128" Image field
150 Flowchart

The invention claimed is:

1. An apparatus for measuring individual data of spectacles arranged in a measurement position, the spectacles having a least one of a left spectacle lens with a left permanent marking and a right spectacle lens with a right permanent marking, the apparatus comprising:

a display for displaying a test structure, an image capture device configured to capture the test structure with an imaging beam path that passes through at least one of the left spectacle lens and the right spectacle lens of the spectacles arranged in the measurement position; configured to capture a section of the spectacle frame of the spectacles arranged in the measurement position, the section defining a coordinate system of the spectacles; and configured to capture the left and right permanent markings, respectively, defining a local, body-inherent coordinate system for the at least one of the left spectacle lens and the right spectacle lens, an illumination device for providing illumination light passing through at least one of the left spectacle lens and the right spectacle lens of the spectacles arranged in the measurement position, an adjustable reflector which, in a first setting, reflects the illumination light having passed through the at least one of the left spectacle lens and the right spectacle lens of the spectacles arranged in the measurement position at least partly back through the at least one of the left spectacle lens and the right spectacle lens and which, in a second setting that differs from the first setting, uncovers the imaging beam path for capturing the test structure displayed on the display with the image capture device, and a computer unit having a computer program for determining the coordinate system of the spectacles from the section, captured by the image capture device, of the spectacle frame of the spectacles arranged in the measurement position, which, from the captured left and right permanent markings of at least one of the left spectacle lens and the right spectacle lens respectively determines the local, body-inherent coordinate system for the left spectacle lens and right spectacle lens and references this to the coordinate system of the spectacles, and which, from the image of the test structure captured by the image capture device and a known spatial orientation of the display relative to the image capture device, determines at least one of a refractive power distribution for at least a section of the left spectacle lens, the refractive power distribution being determined in a coordinate system that is referenced to the coordinate system of the spectacles and to the local, body-inherent coordinate system for the left spectacle lens, and a refractive power distribution for at least a section of the right spectacle lens, the refractive power distribution being determined in a coordinate system that is referenced to the coordinate system of the spectacles and to the local, body-inherent coordinate system for the right spectacle lens.

2. The apparatus as claimed in claim 1, wherein the reflector is arranged on a rotatable disk having at least one sector that transmits light.

3. The apparatus as claimed in claim 1, further comprising at least one of:
a) a mount for the spectacles arranged in the measurement position, the mount defining a known spatial orientation of the spectacles relative to the image capture device, and
b) a device for determining the spatial orientation of the spectacles arranged in the measurement position relative to the image capture device.

4. The apparatus as claimed in claim 1, wherein the image capture device captures the test structure in an image plane conjugate to the left spectacle lens and/or in an image plane conjugate to the right spectacle lens.

5. The apparatus as claimed in claim 1, wherein the image capture device comprises at least one camera.

6. The apparatus as claimed in claim 1, wherein
a) the image capture device has a first camera with a first image plane and a second camera with a second image plane, wherein the left spectacle lens of spectacles arranged in the measurement position is imageable in the first image plane and/or the right spectacle lens of spectacles arranged in the measurement position is imageable in the second image 5 plane; or
b) the image capture device has a camera with an image plane, wherein the left spectacle lens of spectacles arranged in the measurement position is imageable in the image plane and/or the right spectacle lens of spectacles arranged in the measurement position is imageable in the image plane.

7. The apparatus as claimed in claim 1, wherein c) the image capture device has a first camera with a first image plane, a second camera with a second image plane and a third camera with a third image plane, wherein the left spectacle lens and right spectacle lens of spectacles arranged in the measurement position are imageable in at least one of the image planes.

8. The apparatus as claimed in claim 7, wherein the first camera of the image capture device has a camera optical unit with an optical axis that passes through the left spectacle lens of the spectacles arranged in the measurement position and the second camera of the image capture device has a camera optical unit with an optical axis which passes through the right spectacle lens of the spectacles arranged in the measurement position, wherein the optical axis of the camera optical unit of the first camera is parallel to the optical axis of the camera optical unit of the second camera, or in that the first camera of the image capture device has a camera optical unit with an optical axis which passes through the left spectacle lens of the spectacles arranged in the measurement position and the second camera of the image capture device has a camera optical unit with an optical axis that passes through the right spectacle lens of the spectacles arranged in the measurement position, wherein the optical axis of the camera optical unit of the first camera includes a stereo angle α with the optical axis of the camera optical unit of the second camera, or in that the first camera of the image capture device has a camera optical unit with an optical axis that passes through the left spectacle lens of the spectacles arranged in the measurement position and the third camera of the image capture device has a camera optical unit with an optical axis that passes through the right spectacle lens of the spectacles arranged in the measurement position, and wherein the optical axis of the camera optical unit of the first camera includes a stereo angle α' with the optical axis of the camera optical unit of the third camera and wherein the second camera, with the optical axis of the camera optical unit respectively includes a stereo angle β with the optical axes of the camera optical units.

9. A system for checking individual data of glazed spectacles comprising:
the apparatus as claimed in claim 1, and at least one of:
a device for ascertaining a UV absorption behavior of the at least one of the left spectacle lens and the right spectacle lens of the spectacles,
a device for evaluating the arrangement of the at least one of the left spectacle lens and the right spectacle of the spectacles, the device for evaluating the arrangement being configured to take into account a measured refractive power distribution in a coordinate system that is fixed in relation to the spectacles, and
a device for comparing a spatially resolved refractive power of the at least one of the left spectacle lens and the right spectacle lens of the spectacles with intended values.

10. A method for measuring individual data of spectacles arranged in a stationary measurement position, the spectacles having at least one of a left spectacle lens with a left permanent marking and a right spectacle lens with a right permanent marking, the method comprising:

capturing an image of a test structure with an image capture device while an imaging beam path passes through at least one of the left spectacle lens and the right spectacle lens of the spectacles arranged in the measurement position, capturing a section of the spectacle frame of the spectacles with the image capture device, the section defining a coordinate system of the spectacles, providing illumination light which passes through at least one of the left spectacle lens and the right spectacle lens of the spectacles arranged in the measurement position and which is thereafter at least partly reflected back through the at least one of the left spectacle lens and the right spectacle lens, capturing the left and right permanent markings respectively defining the local, body-inherent coordinate system for the at least one of the left spectacle lens and the right spectacle lens with the image capture device, determining the coordinate system of the spectacles from the section of the spectacle frame, captured by the image capture device, of the spectacles arranged in the measurement position, determining the respective local, body-inherent coordinate system for at least one of the left spectacle lens and the right spectacle lens from the captured left and right permanent markings of at least one of the left spectacle lens and the right spectacle lens, referencing the respective local, body-inherent coordinate system for at least one of the left spectacle lens and the right spectacle lens to the coordinate system of the spectacles; and determining a refractive power distribution for at least one section of the left spectacle lens in a coordinate system that is referenced to the coordinate system of the spectacles and to the local, body-inherent coordinate system for the left spectacle lens and/or determining a refractive power distribution for at least one section of the right spectacle lens in a coordinate system that is referenced to the coordinate system of the spectacles and to the local, body-inherent coordinate system for the right spectacle lens, from the coordinates of the test structure and the captured image of the test structure, wherein the image capture device is configured to capture the test structure with an imaging beam path that passes through at least one of the left spectacle lens and the right spectacle lens of the spectacles arranged in the measurement position; and is configured to capture a section of the spectacle frame of the spectacles arranged in the measurement position, the section defining a coordinate system of the spectacles; and is configured to capture the left and right permanent markings, respectively, defining a local, body-inherent coordinate system for the at least one of the left spectacle lens and the right spectacle lens, wherein the test structure is displayed on a display, wherein the illumination light is provided by an illumination device, wherein an adjustable reflector is provided which, in a first setting, reflects the illumination light having passed through the at least one of the left spectacle lens and the right spectacle lens of the spectacles arranged in the measurement position at least partly back through the at least one of the left spectacle lens and the right spectacle lens and which, in a second setting that differs from the first setting, uncovers the imaging beam path for capturing the test structure displayed on the display with the image capture device, and wherein a computer unit is provided, the computer unit having a computer program for determining the coordinate system of the spectacles from the section, captured by the image capture device, of the spectacle frame of the spectacles arranged in the measurement position, which, from the captured left and right permanent markings of at least one of the left spectacle lens and the right spectacle lens respectively determines the local, body-inherent coordinate system for the left spectacle lens and right spectacle lens and references this to the coordinate system of the spectacles, and which, from the image of the test structure captured by the image capture device and a known spatial orientation of the display relative to the image capture device, determines at least one of a refractive power distribution for at least a section of the left spectacle lens, the refractive power distribution being determined in a coordinate system that is referenced to the coordinate system of the spectacles and to the local, body-inherent coordinate system for the left spectacle lens, and a refractive power distribution for at least a section of the right spectacle lens, the refractive power distribution being determined in a coordinate system that is referenced to the coordinate system of the spectacles and to the local, body-inherent coordinate system for the right spectacle lens.

11. A computer program product having a computer program with program code for carrying out the method as claimed in claim 10 when the computer program is executed in a computer unit.

* * * * *

UNITED STATES PATENT AND TRADEMARK OFFICE
CERTIFICATE OF CORRECTION

PATENT NO.         : 10,520,390 B2
APPLICATION NO.    : 15/852899
DATED              : December 31, 2019
INVENTOR(S)        : Carsten Glasenapp and Matthias Hornauer It is certified that error appears in the above-identified patent and that said Letters Patent is hereby corrected as shown below:

In the Claims

Column 20, Line 2, Claim 6, change "image 5 plane" to -- image plane --.

Signed and Sealed this
Twenty-fifth Day of February, 2020

Andrei Iancu
*Director of the United States Patent and Trademark Office*